US008467164B2

(12) United States Patent
Elwell et al.

(10) Patent No.: US 8,467,164 B2
(45) Date of Patent: Jun. 18, 2013

(54) SELF OPTIMIZING ELECTRICAL SWITCHING DEVICE

(75) Inventors: Brian Eugene Elwell, Tyrone, GA (US); Chauncey Harrison Varney, South Hero, VT (US)

(73) Assignee: Cooper Technologies Company, Houston, TX (US)

( * ) Notice: Subject to any disclaimer, the term of this patent is extended or adjusted under 35 U.S.C. 154(b) by 670 days.

(21) Appl. No.: 12/694,797

(22) Filed: Jan. 27, 2010

(65) Prior Publication Data

US 2011/0184578 A1 Jul. 28, 2011

(51) Int. Cl.
*H02H 3/00* (2006.01)

(52) U.S. Cl.
USPC .............................................. 361/87; 307/131

(58) Field of Classification Search
USPC .................. 307/130, 101, 131; 361/160, 170, 361/87; 700/295
See application file for complete search history.

(56) References Cited

U.S. PATENT DOCUMENTS

| | | | | |
|---|---|---|---|---|
| 5,821,642 | A | 10/1998 | Nishhira et al. | |
| 6,233,132 | B1 * | 5/2001 | Jenski | 361/160 |
| 8,310,106 | B2 * | 11/2012 | Koshiduka et al. | 307/101 |
| 2007/0115604 | A1 * | 5/2007 | Zettel et al. | 361/160 |
| 2009/0027824 | A1 * | 1/2009 | Allen et al. | 361/170 |
| 2012/0236443 | A1 * | 9/2012 | Kinoshita et al. | 361/36 |

* cited by examiner

*Primary Examiner* — Daniel Cavallari
(74) *Attorney, Agent, or Firm* — King & Spalding LLP

(57) ABSTRACT

A device for operating a relay to selectively provide power from a power supply to a load. The device determines an activation switching point for activating the relay such that inrush current resulting from the activation is minimal. The device also determines a deactivation switching point for deactivating the relay such that backrush current is minimal. The switching points are determined with respect to a voltage waveform of the supply power. The device varies the timing of the operation of the relay with respect to the voltage waveform and monitors the inrush or backrush current resulting from each timing until a minimum inrush or backrush current is found. The device stores these times in memory for subsequent operation of the relay. To further reduce inrush and backrush currents associated with inductive loads, the device activates and deactivate the relay on opposite half cycles.

20 Claims, 5 Drawing Sheets

SELF OPTIMIZING ELECTRICAL SWITCHING DEVICE

TECHNICAL FIELD

The invention relates generally to electrical switching and more particularly to a device for determining switching points with respect to a supply voltage waveform for activating and deactivating a load control relay.

BACKGROUND

Relays are commonly used to selectively control power from a power supply to an electrical load. Generally, a relay is an electrically operated switch having at least one pair of contacts and a mechanism for opening or closing the pair of contacts based on a control signal. The pair of contacts can be disposed in a circuit between the power supply and the load such that when the contacts are closed, the circuit is complete and power from the power supply can energize the load. When the relay contacts are open, the circuit is also open preventing power from reaching the load.

Opening or closing the relay contacts while the power supply is active can cause a spike in current. Specifically, closing the relay contacts can cause high inrush currents and opening the relay contacts can cause high backrush currents or kickback power. These inrush and backrush currents can be several orders of magnitude greater than the load's steady state current level and can damage the relay contacts, the load, or any other components in the circuit. For example, high inrush currents can cause the contacts to become pitted due to arcing between the contacts. High inrush currents can also cause the relay contacts to become welded together. High backrush currents can erode the relay contacts.

One conventional solution to reducing the level of inrush and backrush currents is to open and close the relay contacts at a zero cross of the supply power voltage waveform. This method can work well with certain load types, but not with all load types. For example, closing the relay contacts at the zero cross for an inductive load can cause large current spikes as residual magnetism in the inductive load may be in phase with the supply power. The optimal switching points for activating and deactivating a relay such that inrush and backrush currents can vary from one load to another.

SUMMARY

A switching device described herein can control power to an electrical load. The switching device can include or be coupled to a load control relay that selectively couples a hot leg of a power supply to the load. The switching device can include a processor for operating the relay and for determining an activation switching point with respect to a supply voltage waveform for activating the relay to provide power to the load such that inrush current is minimized. The processor also can determine a deactivation switching point for deactivating the relay to remove power from the load such that backrush current is minimized. The processor can store the activation and deactivation switching points in non-volatile memory for use in subsequent operation of the relay.

The switching device can find the activation switching point for the load such that inrush current is minimal by activating the relay at different times with respect to the supply voltage waveform and measuring the resulting inrush current for each time. The switching device can initially find the inrush current resulting from activating the relay substantially at the zero cross of the supply voltage. Subsequently, the switching device can adjust the timing of the relay activation and measure the inrush current resulting from each activation. Based on a comparison of the inrush current at the most recent timing and at a previous timing, the switching device can determine whether to adjust the timing again or to use the previous timing corresponding to the least amount of inrush current as the activation switching point for the load. A similar process can be used to find the deactivation switching point for the load.

The switching device can operate the relay at opposite half cycles of the supply voltage waveform for activations and deactivations. For example, the switching device may activate the relay on positive going half cycles and deactivate the relay on negative going half cycles. Alternatively, the switching device may activate the relay on negative going half cycles and deactivate the relay on positive going half cycles. Operating the relay at opposite half cycles can reduce current spikes in inductive loads by causing any residual magnetism remaining in a core of the inductive load to be out of phase.

One aspect of the present invention provides a system for controlling power to an electrical load. The system includes a relay disposed between a power supply and the electrical load for controlling supply power from the power supply to the electrical load. The system also includes a processor logically coupled to the relay. The processor can be programmed to determine an activation switching point for activating the relay. The activation switching point can include a time with respect to a voltage waveform of the supply power where inrush current resulting from activating the relay is minimized. The processor can also be programmed to monitor the voltage waveform and activate the relay at the activation switching point in response to a determination by the processor that the relay should be activated.

Another aspect of the present invention provides a method for determining an activation switching point for activating a relay to provide power to an electrical load. The method can include the steps of selectively activating the relay at switching points with respect to a supply voltage waveform; measuring a level of inrush current resulting from activating the relay at each of the switching points; and selecting the switching point having the least amount of resultant inrush current as the activation switch point.

Another aspect of the present invention provides a method for determining a deactivation switching point for deactivating a relay to remove power from an electrical load. The method can include the steps of selectively deactivating the relay at switching points with respect to a supply voltage waveform; measuring a level of backrush current resulting from deactivating the relay at each of the switching points; and selecting the switching point having the least amount of resultant backrush current as the deactivation switch point.

Another aspect of the present invention provides a method for controlling power to an electrical load. The method can include the steps of monitoring a voltage waveform of an alternating current ("AC") supply voltage provided by an AC power supply; activating a relay in response to receiving a signal to provide power to the electrical load, the relay disposed between the power supply and the electrical load, the relay activation occurring during a first half cycle of the voltage waveform; and deactivating the relay in response to receiving a signal to remove power from the electrical load, the relay deactivation occurring during a second half cycle of the voltage waveform opposite that of the first half cycle.

These and other aspects, features, and embodiments of the invention will become apparent to a person of ordinary skill in the art upon consideration of the following detailed description of illustrated embodiments exemplifying the best mode for carrying out the invention as presently perceived.

BRIEF DESCRIPTION OF THE DRAWINGS

For a more complete understanding of the exemplary embodiments of the present invention and the advantages thereof, reference is now made to the following description in conjunction with the accompanying drawings in which.

Figure 1:
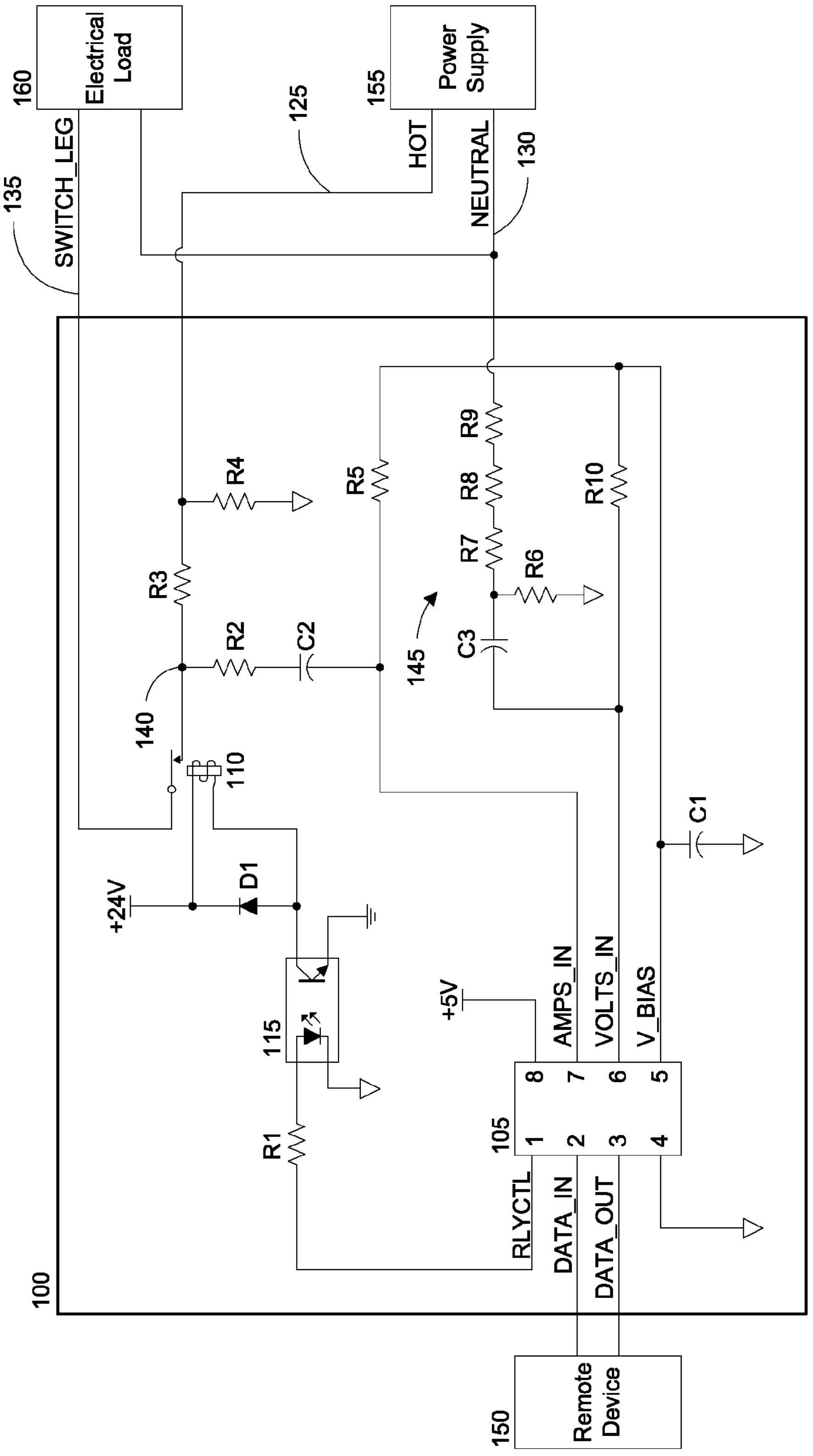
FIG. 1 is an electrical circuit diagram of a device for selectively controlling power to an electrical load while minimizing inrush and backrush currents in accordance with certain exemplary embodiments.

The drawings illustrate only exemplary embodiments of the invention and are therefore not to be considered limiting of its scope, as the invention may admit to other equally effective embodiments. The elements and features shown in the drawings are not necessarily to scale, emphasis instead being placed upon clearly illustrating the principles of exemplary embodiments of the present invention. Additionally, certain dimensions may be exaggerated to help visually convey such principles. In the drawings, reference numerals designate like or corresponding, but not necessarily identical, elements.

DETAILED DESCRIPTION OF EXEMPLARY EMBODIMENTS

An exemplary embodiment for an improved means for selectively controlling power to an electrical load is described herein. In particular, the exemplary embodiments provide a switching device for selectively controlling power to an electrical load while minimizing inrush currents resulting from activating a relay to provide power to the load and backrush currents resulting from deactivating the relay to remove power from the load. The switching device determines a switch timing for activation and deactivation of the relay with respect to a supply voltage waveform such that the inrush and backrush currents are minimal. To further reduce inrush and backrush currents associated with inductive loads, the switching device activates and deactivates the relay on opposite half cycles of the supply voltage waveform.

In certain exemplary embodiments, the invention comprises a computer program that embodies the functions descried herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention.

The following description of exemplary embodiments refers to the attached drawings, in which like numerals indicate like elements throughout the figures. FIG. 1 is an electrical circuit diagram of a switching device 100 for selectively controlling power to an electrical load 160 while minimizing inrush and backrush currents in accordance with certain exemplary embodiments. The device 100 is used with any type of alternating current ("AC") powered load, including lighting systems and HVAC systems. Referring to FIG. 1, the switching device 100 includes a processor 105. The exemplary processor 105 comprises a microprocessor, microcontroller, programmable embedded system, or any other programmable device. The processor 105 includes a programmable controller and configurable analog and digital peripheral functions. For example, the processor 105 includes one or more analog-to-digital ("A/D") converters for converting analog voltage and analog current signals received by the processor 105 into digital signals for use by the programmable controller. In certain alternative embodiments, the processor 105 also includes onboard memory or is logically coupled to a separate memory storage device (not shown). The memory typically includes volatile memory, such as random access memory ("RAM") and non-volatile memory, such as read only memory ("ROM") and flash memory.

The processor 105 is programmed to determine a switching point for activating a relay 110 to provide power to the load 160 that results in a minimum amount of inrush current for the load 160. The processor 105 is also programmed to determine a switching point for deactivating the relay 110 to remove power from the load 160 that results in a minimum amount of backrush current for the load 160. Typically, the switching points are determined with respect to a voltage waveform of the supply voltage provided by the power supply 155. The processor 105 stores the switching points in memory and operates the relay 110 using the stored switching points. The processor 105 periodically reevaluates and updates the switching points to confirm that the timing of the switching points remains optimal in case there are changes to the load 160, or if the device 100 is connected to a different load (not shown). Some exemplary functions performed by the processor 105 in conjunction with other components of the switching device 100 are illustrated in FIGS. 2-5 and described below.

In the exemplary embodiment of FIG. 1, the relay 110 includes a pair of relay contacts disposed between a hot leg 125 of a power supply 155 and a switch leg 135 that is connected to the load 160. When the relay 110 is activated to close the relay contacts, current is allowed to flow from the power supply 155 via the hot leg 125 to the load 160 via the switch leg 135. The processor 105 selectively activates and deactivates the relay 110 by way of a relay control output signal ("RLYCTL") at terminal 1 of the processor 105. Terminal 1 of the processor 105 is coupled to the relay 110 via an optocoupler 115 and associated resistor R1 and diode D1. The optocoupler 115 provides electrical isolation between the processor 105 and a +24V power source used to energize a coil of the relay 110. The processor 105 activates the relay 110 by providing a positive relay control signal to the optocoupler 115 that, in turn, allows the +24V supply to energize the relay coil and close the relay contacts. The processor 105 deactivates the relay 110 by removing the positive relay control signal from the optocoupler 115, thus de-energizing the relay coil and opening the relay contacts. Although in this exemplary embodiment, the relay 110 comprises an electromagnetic relay having an electromagnetic core, other types of relays and switches, such as a solid-state relay, can be used with the switching device 100.

The processor 105 monitors the amount of current flowing on the hot leg 125 to determine the level of inrush current resulting from activating the relay 110 and the amount of backrush current resulting from deactivating the relay 110. In this exemplary embodiment, the device 100 employs a shunt resistor R3 disposed on the hot leg 125 in series with the load 160 for measuring the inrush and backrush currents. The shunt resistor R3 drops supply voltage from the power supply 155 by an amount proportional to the amount of current flowing through the resistor R3. Because the resistance of resistor R3 is known, the processor 105 is able to calculate the amount of current flowing on the hot leg 125 by dividing the amount of the voltage drop across resistor R3 by the resistance of R3. Terminal 7 of the processor 105 is coupled to the hot leg 125 at point 140 on the side of the resistor R3 opposite that of the power supply 155 via a resistor R2 and a capacitor C2. The processor 105 can determine the voltage drop across resistor R3 by sensing the voltage level at terminal 7 and making a calculation based on the resistance of resistors R2 and R3 and the voltage level at terminal 7.

Terminal 6 of the processor 105 is connected to a neutral leg 130 of the power supply 155 via a voltage divider network 145 including resistors R6-R9 and a capacitor C3. The voltage divider network 145 reduces the voltage level of the neutral leg 130 to a level suitable for the processor 105. The processor 105 uses the voltage level of the neutral leg 130 in conjunction with the voltage level of the hot leg 125 to monitor the voltage waveform of the supply power. The processor 105 monitors the voltage waveform to detect switching points for activating and deactivating the relay 105.

In certain exemplary embodiments, the processor 105 includes A/D converters for converting the voltage level signals received at terminals 6 and 7 into digital signals for use by the processor 105. The processor 105 also includes programmable gain amplifiers that are used to control the magnitude of the voltage signals to maximize the resolution within the processor 105. In this exemplary embodiment, the A/D converters have an input range of zero to positive five volts. To compensate for voltages below zero volts, the processor 105 provides a bias voltage ("V_BIAS") to terminals 6 and 7 via resistors R10 and R5, respectively. This bias voltage offsets the voltages that would be sensed by the processor 105 at terminals 6 and 7 such that the voltages are within the range of 0 VAC and +5 VAC. Typically, the voltage bias is +2.5 VDC (midpoint of the input range of the A/D converters) so that a voltage of +2.5 VDC measured at either terminal 6 or 7 corresponds to an actual value of 0 VAC. For example, if the processor 105 senses a voltage of +2.5 VDC at terminal 6, then the processor 105 would determine that the supply voltage is at a zero crossing.

The processor 105 communicates with a remote device 150, such as a computer, programming device, or control device, via communication terminals 2 and 3. The processor 105 receives information via terminal 2 and transmits information via terminal 3. In certain exemplary embodiments, a user programs the processor 105 to operate the relay 110 and thus the load 160 via terminal 2. For example, the user programs the processor 105 to activate a lighting load based on time of day, occupancy, or ambient lighting. Alternatively, or additionally, the processor 105 receives control signals from a control device via terminal 2 commanding the processor 105 to activate or deactivate the load 160. The processor 105 then provides a status to the control device via terminal 3. A user is also able to download information from the processor 105, such as inrush and backrush current levels corresponding to relay activations and deactivations, via the remote device 150. In certain exemplary embodiments, the processor 105 communicates via an asynchronous serial communications protocol. One of ordinary skill in the art would appreciate that many other communications protocols are possible.

In certain exemplary embodiments, the processor 105 determines if the relay 110 of the device 100 is not wired properly with the load 160 and the power supply 155. For example, the processor 105 can supply voltage waveform to determine if the hot leg 125 and switch leg 135 connections are reversed. If the hot leg 125 is connected to the load 160 instead of the power supply 155, the processor 105 would sense a non-zero voltage level when the relay 110 is activated only instead of sensing a continuous AC voltage waveform from the power supply 155. If the processor 105 does not sense a voltage waveform after deactivating the relay 110, the processor 105 can determine that the device 100 is wired incorrectly. The processor 105 can store information indicative of this incorrect wiring in non-volatile memory. Thus, if a user returns the device 100 as a defective product, the information can be checked to determine if there was a wiring error. Additionally, this information can be communicated to the remote device 150 to alert a user that the device 100 is not wired correctly.

Although in this exemplary embodiment, the relay 110 is included with the switching device 100, in alternative embodiments, the switching device 100 may be coupled to an external relay. Thus, in this alternative embodiment, the switching device 100 determines switching points for an external relay and the load being powered via the external relay and also controls power to the load by operating the external relay at the determined switching points. Additionally or alternatively, the switching device 100 may be connected to an external current sensor and one or more external voltage sensors for monitoring the current on the hot leg 125 and the supply voltage waveform. In such an embodiment, the processor 105 receives digital input signals from the external current and voltage sensors indicating the current and voltage levels.

Figure 2:
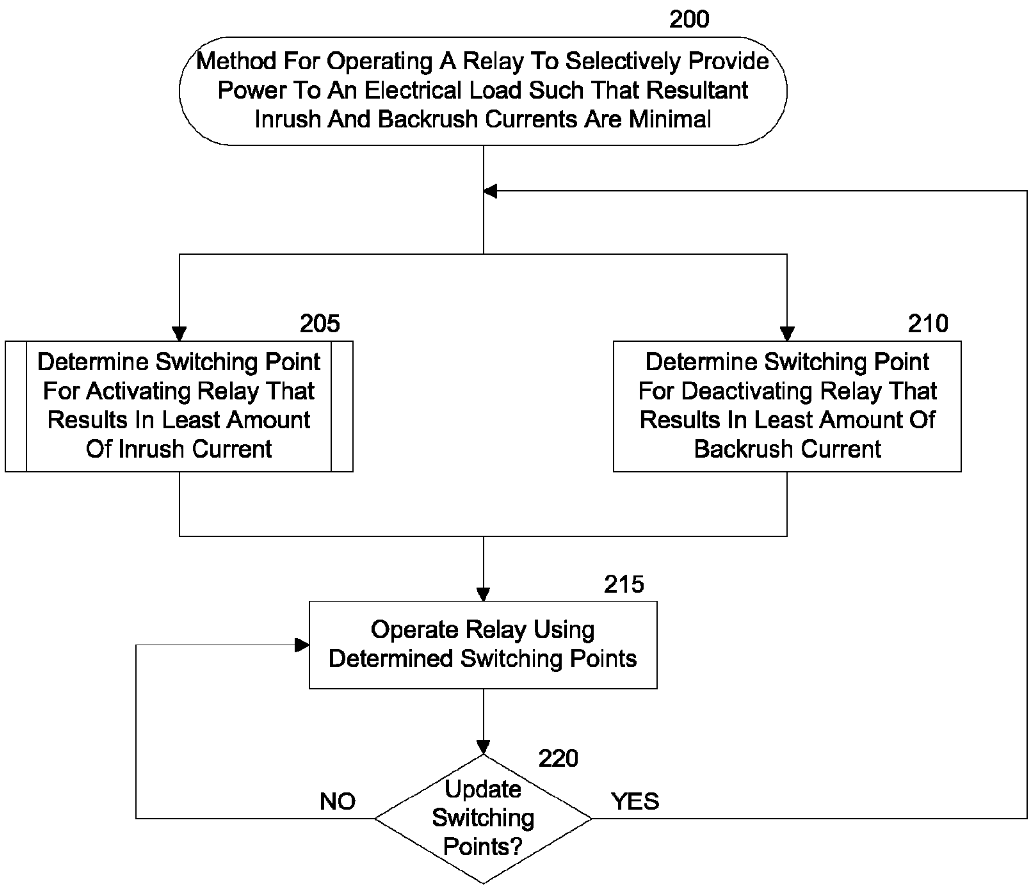
FIG. 2 is a flow chart illustrating a method for operating a relay to selectively provide power to an electrical load such that resultant inrush and backrush currents are minimal in accordance with certain exemplary embodiments.

FIG. 2 is a flow chart illustrating an exemplary method 200 for operating a relay 110 to selectively provide power to an electrical load 160, such that resultant inrush and backrush currents are minimal in accordance with certain exemplary embodiments. Referring now to FIGS. 1 and 2, the exemplary method begins at step 205, where the processor 105 determines a switching point for activating the relay 110 to provide power to the electrical load 160 that results in the least amount of inrush current. In certain exemplary embodiments, this activation switching point is determined with respect to the zero crossing of the supply voltage on the hot leg 125. The switching point having the least amount of inrush current may be before or after the zero crossing. To determine the activation switching point, the processor 105 first determines the amount of inrush current resulting from activating the relay 110 substantially at the zero crossing. The processor 105 then adjusts the timing of the activation switching point and measures the level of inrush current at each timing to find the activation switching point resulting in the least amount of inrush current. The activation switching point resulting in the least amount of inrush current is stored in memory for subsequent activations of the relay 110. Step 205 is described in further detail below with reference to FIG. 3. After step 205, the method 200 proceeds to step 215.

In step 210, the processor 105 determines a switching point for deactivating the relay 110 that results in the least amount of backrush current. In one exemplary embodiment, the sub-steps of Step 210 are substantially similar to that of step 205, described in more detail below with reference to FIG. 3. The processor 105 first determines the amount of backrush current resulting from deactivating the relay 110 substantially at the zero crossing. The processor 105 adjusts the timing of the switching point and measures the level of backrush current at each timing to find the deactivation switching point resulting in the least amount of backrush current. The deactivation switching point resulting in the least amount of backrush current is stored in memory for subsequent deactivations of the relay 110. After step 210, the method 200 proceeds to step 215.

In step 215, the processor 105 operates the relay 215 using the activation and deactivation switching points stored in memory in steps 205 and 210. As described above with reference to FIG. 1, in certain exemplary embodiments, the processor 105 is programmed to control the relay 110 based on various conditions or receives control signals from an external source. For example, if the electrical load is a light, the processor 105 can be programmed to activate the light when ambient lighting is low or when a room is occupied. The processor 105 can also be programmed to deactivate the light when the ambient lighting is sufficient or the room is not occupied. When the processor 105 determines that the load 160 should be activated, the processor 105 activates the relay 110 at the next occurrence of the activation switching point to minimize the amount of inrush current. Likewise, when the processor 105 determines that the load 160 should be deactivated, the processor 105 deactivates the relay 110 at the next occurrence of the deactivation switching point.

In certain exemplary embodiments, the processor 105 determines the activation switching and deactivation switching points at opposite half cycles of the supply voltage waveform. For example, the processor 105 searches for an activation switching point on the positive going half cycle and searches for a deactivation switching point on the negative going half cycle. Alternatively, the processor 105 searches for an activation switching point on the negative going half cycle and searches for a deactivation switching point on the positive going half cycle. The processor 105 then activates the relay 110 at an activation switching point on one half cycle and deactivates the relay 110 at a deactivation switching point on the opposite half cycle. Engaging and disengaging the contacts of the relay 110 on opposite half cycles reduces the amount if inrush current created with inductive loads. Any residual magnetism remaining in the core of an inductive load will be out of phase and therefore will not have the opportunity to generate a large current spike.

The processor 105 continues operating the relay 110 to control power to the electrical load 160 indefinitely using the determined activation and deactivation switching points. The processor 105 is programmed to periodically reevaluate the switching points to confirm that the timing of the switching points is optimized in case the electrical load 160 is changed. The time period between reevaluations of the switching points can range from each cycle of activating an deactivating the relay 110 to any number of cycles. For example, the processor 105 can continuously monitor the inrush and back rush currents and adjust the switching points when appropriate. Alternatively, the processor 105 may reevaluate the switching points after a certain number of cycles, such as after 100 cycles. If the processor 105 determines that the switching points should be reevaluated and updated in step 220, the method 200 returns to steps 205 and 210. Otherwise, the method 200 branches to step 215 to continue operating the relay 110 using the previously determined switching points.

Figure 3:
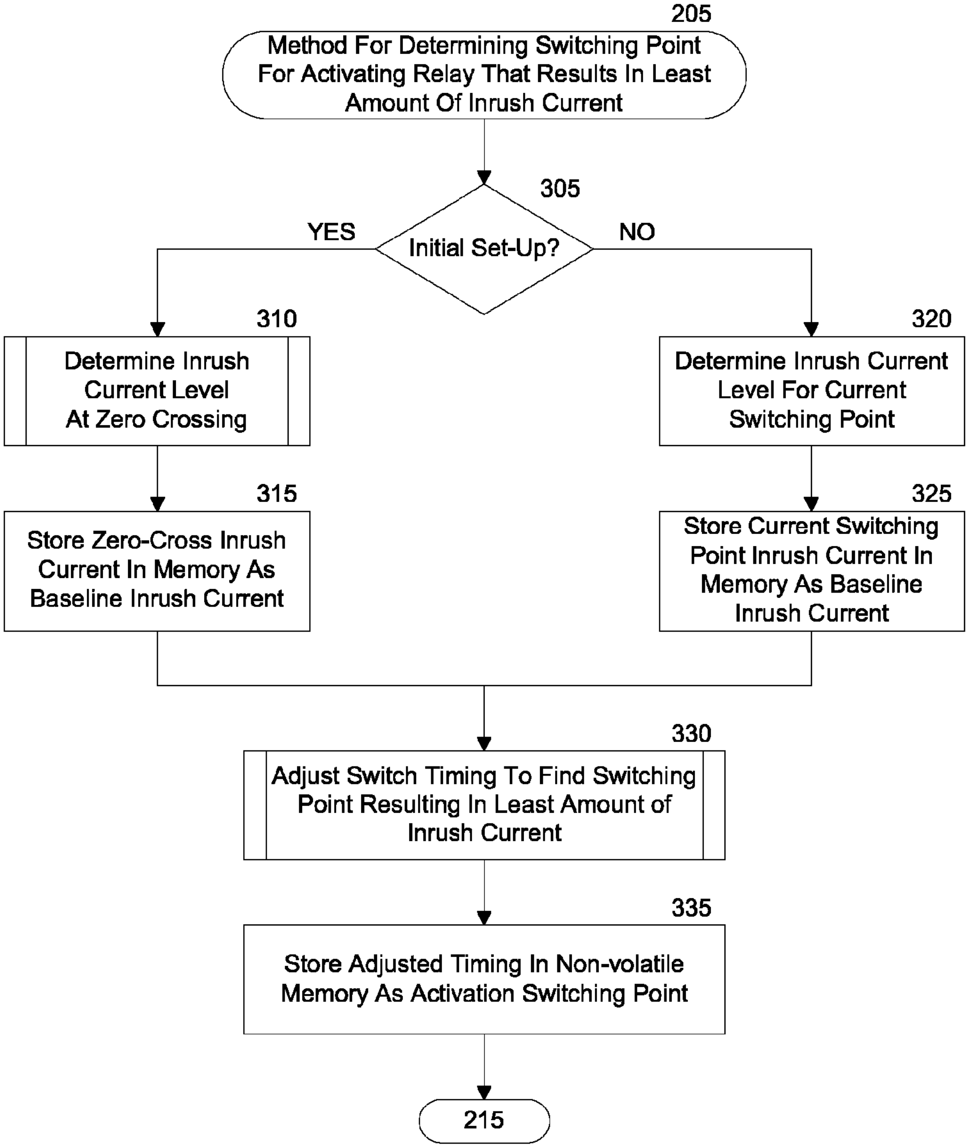
FIG. 3 is a flow chart illustrating a method for determining a switching point for activating a relay to provide power to an electrical load that results in the least amount of inrush current in accordance with certain exemplary embodiments.

FIG. 3 is a flow chart illustrating a method 205 for determining a switching point for activating a relay 110 to provide power to an electrical load 160 that results in the least amount of inrush current in accordance with certain exemplary embodiments. Although the method 205 is described in terms of determining an activation switching point, the method 205 can similarly be used to determine a deactivation switching point.

Now referring to FIGS. 1, 2 and 3, in step 305, the processor 105 determines whether the activation switching point has been determined previously for the electrical load 160. For example, the processor 105 accesses the memory to determine if an activation switching point has previously been stored. If an activation switching point has not been previously determined (e.g., initial setup for a new installation), the "YES" branch is followed to step 310.

In step 310, the processor 105 determines the amount of inrush current resulting from activating the relay 110 at the zero crossing of the input voltage waveform. In this exemplary embodiment, the processor 105 monitors the input voltage waveform and sends a relay control signal to activate the relay 110 at a zero crossing of the input voltage waveform. The processor 105 activates the relay 110 at the zero crossing of the rising half cycle or the falling half cycle of the supply voltage waveform. Typically, there is an inherent time delay between the time that the processor 105 generates the relay control signal and when the contacts of the relay 110 actually close. To account for this time delay, the processor 105 generates the relay control signal before the zero crossing so that the relay contacts close substantially at the zero crossing. In certain exemplary embodiments, the processor 105 generates the relay control signal at a certain supply voltage level prior to the zero crossing to account for the inherent time delay. In certain alternative embodiments, the processor 105 monitors for a zero crossing and generates the relay control signal after a time delay from that zero crossing to account for the inherent time delay.

In certain exemplary embodiments, the processor 105 includes a comparator having a bandgap of approximately 1.3 VDC for timing the activation of the relay 110. The processor 105 calculates the zero crossings in the supply voltage waveform based on the comparator output voltage edges. The duty cycle of the comparator output waveform can vary with changes to the supply voltage. The processor 105 can first sense a negative going edge T0. The next edge is the first positive going edge, T1, and the following edge is the next negative going edge, T2. Using these edges T0-T2, the processor 105 can determine the total cycle time, which is T2−T0. The processor 105 can also determine the center of the positive peak of the supply voltage waveform by dividing (T2−T1) by two. The processor 105 can then divide the total cycle time by four to find a number to add to or subtract from center of the positive peak to determine the difference from T0 to the next positive going or negative going zero crossing. The processor 105 can then use the negative edge T3 to time subsequent positive going or negative going zero crossing. This process is independent of the supply voltage frequency. Thus, the device 100 can be used for both 50 Hz and 60 Hz power is different parts of the world and also in applications where the supply voltage frequency is unknown or inaccurate.

After activating the relay 110 at the zero crossing, the processor 105 monitors the amount of current flowing on the hot leg 125. Step 310 is described in further detail below with reference to FIG. 4. In step 315, the processor 105 stores the peak zero cross current in memory as a baseline inrush current.

Referring back to step 305, if an activation switching point has been determined previously, the "NO" branch is followed to step 320. In step 320, the processor 105 determines the amount of inrush current resulting from activating the relay 110 at the current activation switching point. Step 320 can be substantially similar to that of step 310 with the exception of the timing of the relay 110 activation. For example, the processor 105 monitors the input voltage level and sends a relay control signal to activate the relay 110 at the current activation switching point. As described above with reference to FIG. 2, the activation switching point may be on the rising or falling half cycle of the supply voltage waveform. The processor 105 also accounts for a time delay between generating the relay control signal and the closing of the relay contacts by generating the relay control signal before the activation switching point based on the time delay. In certain exemplary embodiments, the processor 105 is programmed with a time delay, such as eight milliseconds, based on the type of relay 110. The processor 105 can then adjust this time delay in small increments to compensate for differences in relays and actual loads. as described above with reference to step 310 of FIG. 3, the processor 105 can time the generation of the relay control signal based on a voltage level of the supply voltage or based on a time with respect to a zero crossing. After activating the relay 110 at the current activation switching point, the processor 105 monitors the amount of current flowing on the hot leg 125. In step 325, the processor 105 stores the peak current in memory as the baseline inrush current.

In step 330, the processor 105 adjusts the timing for activating the relay 110 to find a switching point that results in the least amount of inrush current. For example, the processor 105 monitors the amount of inrush current at each switching point and adjusts the timing of subsequent switching points based on a comparison of the inrush current at the present switching point and the inrush current at a previous switching point. Step 330 is described in further detail below with reference to FIG. 5. After the activation switching point resulting in the least amount of inrush current is found, the processor 105 stores this activation switching point in memory in step 335. Typically, the activation switching point is stored in non-volatile memory to avoid repeating method 205 if power to the device 100 is lost. After step 335, the method 205 proceeds to step 215 of FIG. 2.

Figure 4:
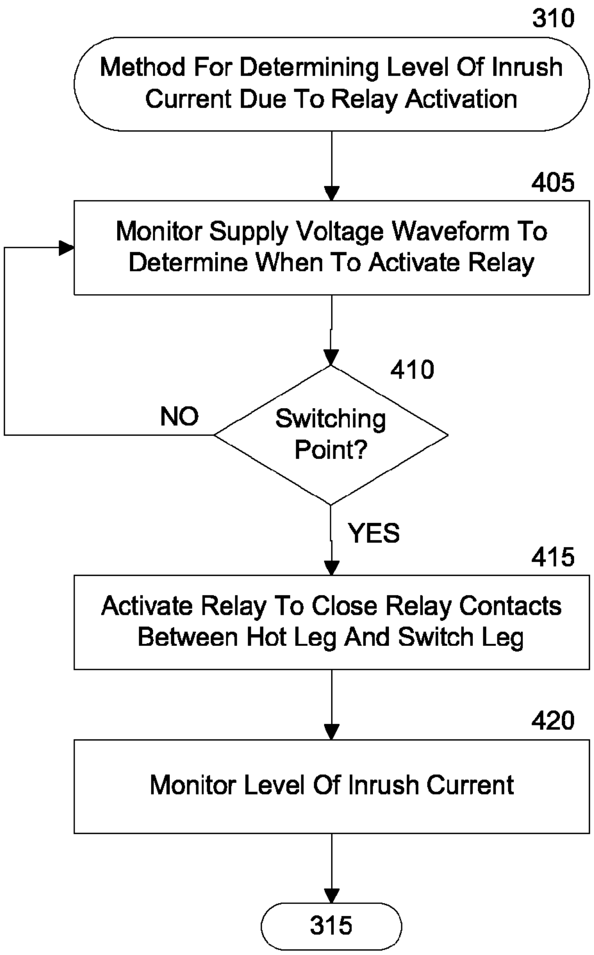
FIG. 4 is a flow chart illustrating a method for determining a level of inrush current due to activating a relay and providing power to a load in accordance with certain exemplary embodiments.

FIG. 4 is a flow chart illustrating an exemplary method 310 for determining a level of inrush current due to activating a relay 110 and providing power to a load 160 in accordance with certain exemplary embodiments, as referenced in step 310 of FIG. 3. Referring now to FIGS. 1, 3, and 4, the exemplary method 310 begins at step 405, where the processor 105 monitors the voltage waveform of the supply power to determine when to activate the relay 110. In certain exemplary embodiments, the processor 105 monitors the voltage potential at the hot leg 125 with respect to the voltage potential on the neutral leg 130 to determine the voltage level of the hot leg 125. The processor 105 continues to monitor the voltage waveform until the current switching point is detected. The current switching point can be the zero cross as referenced in step 310 of FIG. 3 or an adjusted timing as referenced in step 320 of FIG. 3. When the processor 105 detects the current activation switching point in step 410, the method proceeds to step 415.

In step 415, the processor 150 generates and sends a relay control signal to the relay 110 to activate the relay 110. The relay 110 closes the relay contacts and allows current to flow from the power supply 155 to the load 160. In step 420, the processor 105 monitors the amount of inrush current resulting from activating the relay 110. For example, the processor 105 determines the peak level of inrush current and stores this peak inrush current in memory. The exemplary method 310 then proceeds to step 315 of FIG. 3.

Figure 5:
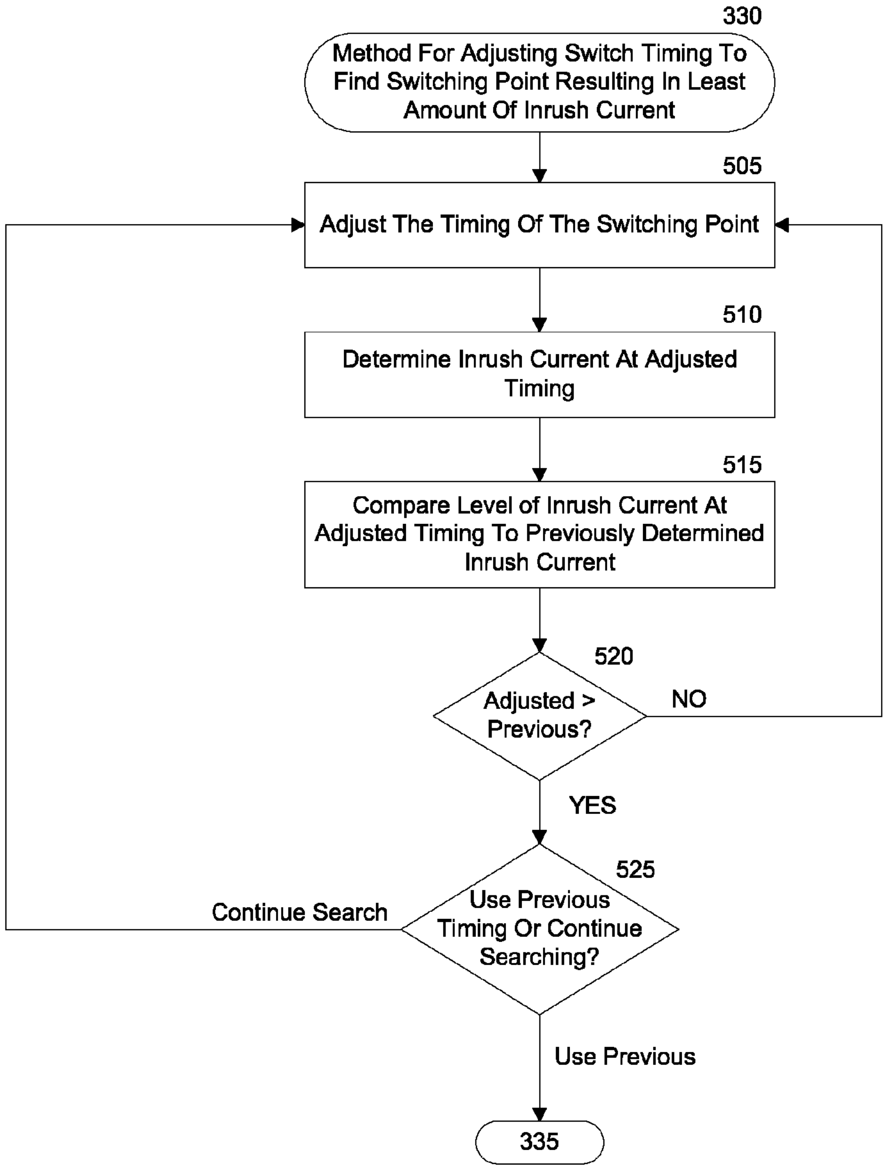
FIG. 5 is a flow chart illustrating a method for adjusting switch timing to determine an activation switching point resulting in the least amount of inrush current in accordance with certain exemplary embodiments.

FIG. 5 is a flow chart illustrating an exemplary method 330 for adjusting switch timing to determine an activation switching point resulting in the least amount of inrush current in accordance with certain exemplary embodiments. Now referring to FIGS. 1, 3, and 5, the exemplary method 330 begins at step 505, where the processor 105 adjusts the timing of the switching point with respect to a previous switching point and to a zero cross of the supply voltage waveform. For example, in a first iteration of step 505, the processor 105 adjusts the timing in one direction with respect to the zero cross. For example, the processor 105 adjusts the timing of the switching point to occur at a time after the voltage waveform makes a zero crossing during a positive going half cycle of the voltage waveform. Alternatively, the processor 105 adjusts the timing in the opposite direction and thus prior to the zero cross of the positive going half cycle.

In certain exemplary embodiments, the processor 105 is programmed to adjust the magnitude of the time adjustment based on various parameters. For example, during an initial setup for a particular electrical load 160, the processor 105 is programmed to make larger changes to the timing of the switching point than that for a reevaluation of a previously identified activation switching point. For a previously identified activation switching point, the processor 105 makes smaller adjustments to the timing proximal to the previously identified activation switching point to confirm that the switching point is still optimal in case there have been any changes to the electrical load 160.

In step 510, the processor 105 determines the inrush current for the adjusted timing of the activation switching point. In certain exemplary embodiments, the actions occurring in step 510 are substantially similar to that of Step 310 described above with reference to FIG. 4. For example, the processor 105 monitors the supply voltage waveform and sends a relay control signal to activate the relay 110 at the adjusted activation switching point. After activating the relay 110 at the adjusted activation switching point, the processor 105 monitors the amount of current flowing on the hot leg 125.

In step 515, the processor 105 compares the amount of inrush current resulting from activating the relay 110 at the adjusted timing to the inrush current resulting from activating the relay 110 at the previous switching point. In step 520, an inquiry is conducted to determine whether the inrush current of the adjusted timing is greater than that of the previous inrush current. In one exemplary embodiment, the inquiry of step 520 is completed by the processor 105. If the inrush current of the adjusted timing is greater than that of the previous inrush current, the "YES" branch is followed to step 525. Otherwise, the "NO" branch is followed back to step 505 to adjust the timing of the activation switching point.

In certain exemplary embodiments, the processor 105 continues adjusting the timing in the same direction with respect to the zero cross if the inrush current continues to decrease with each adjustment. Once an increase in inrush current is detected, the processor 105 determines in step 525 whether to use the switching point corresponding to the last decrease in inrush current or to continue searching for an optimal activation switching point. If the processor 105 determines to keep searching, the processor 105 reduces the magnitude of time adjustments and reverses the direction of the time adjustments with respect to the zero cross. If another increase in inrush current is detected in that direction, the processor 105 can either use the switching point corresponding to the last decrease in inrush current or reverse the direction of time adjustments again. This process can continue indefinitely or until the processor 105 determines that the minimum or acceptable amount of inrush current is found.

If the processor 105 determines to continue searching, the "Continue Search" branch is followed back to step 505. If the processor 105 determines to use the switching point corresponding to the last decrease in inrush current as the activation switching point for the relay 110, the "Use Previous" branch is followed to step 335 of FIG. 3. Although the methods illustrated in FIGS. 3-5 are described in terms of determining an activation switching point that results in the least amount of inrush current, the methods of these figures can similarly be used to determine a deactivation switching point that results in the least amount of backrush currents.

In certain exemplary embodiments, the processor 105 first searches one side of a zero cross to find the switching point resulting in the least amount of inrush current on that side of the zero cross. Then, the processor 105 searches the other side of the zero cross for the switching point resulting in the least amount of inrush current on that side of the zero cross. The processor 105 compares the two switching points and selects the switching point resulting in the least amount of inrush current as the activation switching point.

In certain exemplary embodiments, the processor 105 determines an activation switching point resulting in the least amount of inrush current for the positive going half cycle of the supply voltage waveform and an activation switching point resulting in the least amount of inrush current for the negative going half cycle of the supply voltage waveform. The processor 105 also determines a deactivation switching point resulting in the least amount of backrush current for the positive going half cycle of the supply voltage waveform and a deactivation switching point resulting in the least amount of backrush current for the negative going half cycle of the supply voltage waveform. The processor 105 determines which half cycle to activate the relay 110 and which half cycle to deactivate the relay 110 based on these inrush and backrush currents.

One of ordinary skill in the art would appreciate that the present invention supports systems and methods for selectively controlling power to an electrical load is described herein. In particular, the present invention provides a switching device for selectively controlling power to an electrical load while minimizing inrush currents resulting from activating a relay to provide power to the load and backrush currents resulting from deactivating the relay to remove power from the load. The switching device can determine a switch timing for activation and deactivation of the relay with respect to a supply voltage waveform such that the inrush and backrush currents are minimal. To further reduce inrush and backrush currents associated with inductive loads, the switching device can activate and deactivate the relay on opposite half cycles of the supply voltage waveform.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A system for controlling power to an electrical load, the system comprising:

a relay disposed between a power supply and the electrical load for controlling supply power from the power supply to the electrical load; and a processor logically coupled to the relay, the processor programmed for:

determining an activation switching point for activating the relay, the activation switching point comprising a time with respect to a voltage waveform of the supply power whereby inrush current resulting from activating the relay is minimized, wherein determining the activation switching point further comprises selectively activating the relay at a first plurality of times with respect to the voltage waveform, receiving an indication of an amount of inrush current resulting from each relay activation, determining a timing corresponding to a least amount of inrush current, and selecting the timing corresponding to the least amount of inrush current as the activation switching point;

monitoring the voltage waveform; and activating the relay at the activation switching point in response to a determination by the processor that the relay should be activated.

2. The system of claim 1, further comprising a current sensor for measuring inrush current resulting from activating the relay and transmitting an indication of the measure of inrush current to the processor.

3. The system of claim 1, wherein the timing corresponding to the least amount of inrush current comprises a zero cross of the voltage waveform.

4. The system of claim 1, wherein the processor is further programmed for:

determining a deactivation switching point for deactivating the relay, the deactivation switching point comprising a time with respect to the voltage waveform of the supply voltage whereby backrush current resulting from deactivating the relay is minimized; and deactivating the relay at the deactivation switching point in response to a determination by the processor that the relay should be deactivated.

5. The system of claim 4, further comprising a current sensor for measuring backrush current resulting from deactivating the relay and transmitting an indication of the measure of backrush current to the processor.

6. The system of claim 4, wherein the processor determines the deactivation switching point by selectively deactivating the relay at a second plurality of times with respect to the voltage waveform, receiving an indication of an amount of backrush current resulting from each relay deactivation, and determining a timing corresponding to a least amount of backrush current, and selecting the timing corresponding to the least amount of backrush current as the deactivation switching point.

7. The system of claim 4, wherein the time of the activation switching point occurs during a first half cycle of the voltage waveform and the time of the deactivation switching point occurs during a second half cycle of the voltage waveform opposite that of the first half cycle.

8. The system of claim 1, wherein the processor is further programmed for determining whether the relay is connected incorrectly between the power supply and the electrical load.

9. The system of claim 8, wherein the processor determine that the relay is connected incorrectly by monitoring the voltage waveform when the relay is deactivated and determines that the relay is connected incorrectly when the voltage waveform maintains a voltage level of zero volts.

10. A method for determining an activation switching point for activating a relay to provide power to an electrical load, the method comprising the steps of:

selectively activating the relay at a plurality of switching points with respect to a supply voltage waveform;

measuring a level of inrush current resulting from activating the relay at each of the plurality of switching points; and selecting the switching point having the least amount of resultant inrush current as the activation switch point.

11. The method of claim 10, comprising activating the relay at a zero cross of the supply voltage waveform and measuring a level of inrush current resulting from activating the relay at the zero cross of the supply voltage waveform.

12. The method of claim 10, wherein the step of selectively activating the relay comprises:

monitoring the supply voltage waveform for an indication of one of the plurality of switching points; and transmitting a signal to the relay commanding the relay to close a pair of relay contacts and allow power to the electrical load substantially at the one switching point.

13. The method of claim 10, wherein the step of selectively activating the relay comprises:

activating the relay at a first switching point and at a second switching point different than that of the first switching point;

comparing a first level of inrush current resulting from the activation at the first switching point to a second level of inrush current resulting from the activation at the second switching point; and determining a third switching point with respect to the supply voltage waveform for activating the relay based on the comparison.

14. A method for determining a deactivation switching point for deactivating a relay to remove power from an electrical load, the method comprising the steps of:

selectively deactivating the relay at a plurality of switching points with respect to a supply voltage waveform;

measuring a level of backrush current resulting from deactivating the relay at each of the plurality of switching points; and selecting the switching point having the least amount of resultant backrush current as the deactivation switch point.

15. The method of claim 14, comprising deactivating the relay at a zero cross of the supply voltage waveform and measuring a level of backrush current resulting from deactivating the relay at the zero cross of the supply voltage waveform 16. The method of claim 14, wherein the step of selectively deactivating the relay comprises:

monitoring the supply voltage waveform for an indication of one of the plurality of switching points; and transmitting a signal to the relay commanding the relay to open a pair of relay contacts and remove power from the electrical load substantially at the one switching point.

17. The method of claim 14, wherein the step of selectively deactivating the relay comprises:

deactivating the relay at a first switching point and at a second switching point different than that of the first switching point;

comparing a first level of backrush current resulting from the deactivation at the first switching point to a second level of backrush current resulting from the deactivation at the second switching point; and determining a third switching point with respect to the supply voltage waveform for deactivating the relay based on the comparison.

18. A method for controlling power to an electrical load, the method comprising:

monitoring a voltage waveform of an alternating current ("AC") supply voltage provided by an AC power supply;

activating a relay at an activation switching point to provide power to the electrical load, the relay disposed between the power supply and the electrical load, the relay activation occurring during a first half cycle of the voltage waveform, wherein the activation switching point is determined by measuring a level of inrush current resulting from activating the relay at one or more switching points and selecting the switching point having the least amount of resultant inrush current as the activation switching point; and deactivating the relay in response to receiving a signal to remove power from the electrical load, the relay deactivation occurring during a second half cycle of the voltage waveform opposite that of the first half cycle.

19. The method of claim 18, wherein the first half cycle comprises a positive going half cycle and the second half cycle comprises a negative going half cycle.

20. The method of claim 18, wherein the first half cycle comprises a negative going half cycle and the second half cycle comprises a positive going half cycle.

* * * * *